Nov. 27, 1956   F. H. BUSCH ET AL   2,772,109
SEAL FOR A METER HOUSING
Filed March 31, 1954
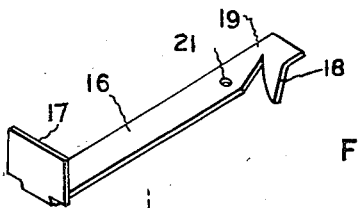
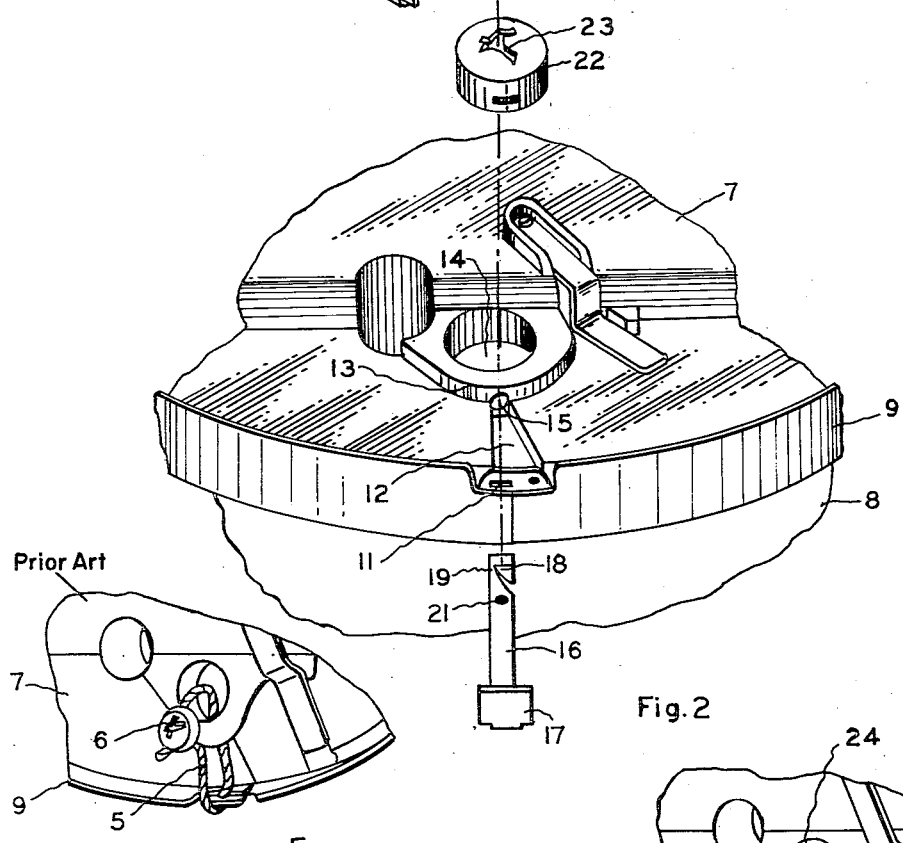
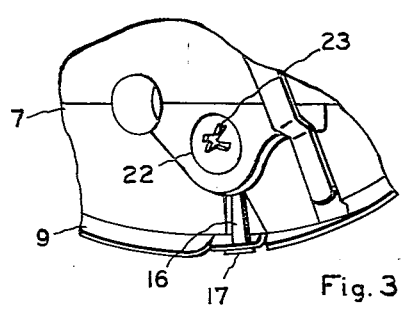
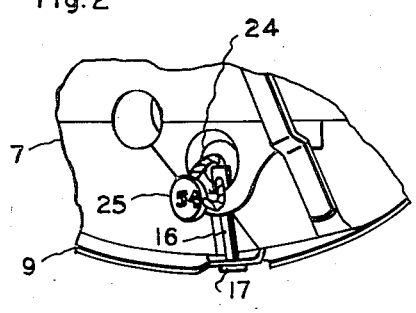
Inventors:
Floyd H. Busch
Dario A. Quaglieri
By, Richard E. Hosley
Their Attorney

UNITED STATES PATENT OFFICE 2,772,109
Patented Nov. 27, 1956

2,772,109

SEAL FOR A METER HOUSING

Floyd H. Busch, Rochester, N. H., and Dario A. Quaglieri, Boston, Mass., assignors to General Electric Company, a corporation of New York Application March 31, 1954, Serial No. 420,052

2 Claims. (Cl. 292—307)

The present invention relates generally to an improved meter housing and in particular to novel means for effectively sealing such housing whereby improper removal of the housing cover may be readily detected.

It has long been the practice in the meter art to provide sealing by looping a wire between the cover and the meter base, bringing the ends of the wire together and embedding them within a lead plug. This practice offers certain disadvantages—such as a relatively loose fit of the meter cover, possible contact of metal parts with live contacts in the meter socket in the event of breakage of the seal, corrosion of sealing parts, and difficulty in effectively re-sealing meters in the field.

Therefore, it is an object of the present invention to provide sealing means designed to overcome the disadvanages of the prior art methods and at the same time provide an extremely simple and low cost arrangement. Other objects and advantages will be apparent upon reference to the detailed specification set forth below.

Briefly, the invention contemplates the use of a metal tab interconnecting the housing base and cover, the tab having an outer enlarged head and an inner enlarged head to hold it in place. Suitable apertures can be provided in the housing parts so that when the cover is properly affixed to the base, the apertures are aligned and permit insertion of the metal tab. The inner end of the tab will be permanently embedded within a plastic body, and this body will be confined within a cavity in the housing base. The inner head is thus formed by this latter action, and the tab is held securely in place to thereby effectively and positively seal the meter housing.

The benefits and advantages to be derived from the present invention will be best understood upon reference to the detailed specification set forth below, particularly when taken in conjunction with the drawings annexed hereto, in which:

Figure 1 is a partial view of a meter housing illustrating the sealing arrangements of the prior art; and Figure 2 is an enlarged exploded view in perspective of a portion of a meter housing showing the novel sealing arrangements described and claimed herein; and Figure 2a is an enlarged perspective view of the novel sealing tab forming a part of the subject invention; and Figure 3 is a partial view of a meter housing illustrating the sealing arrangement covered by the subject invention as it looks when in place; and Figure 4 is a partial view of a meter housing illustrating a proposed field sealing arrangement ideally adapted for use with the subject invention.

Referring first to Figure 1, there is shown one form of prior art sealing arrangement wherein a length of wire 5 has its ends drawn through suitable apertures, provided in the base and cover of a meter housing, and brought together and embedded within a lead plug 6. It is seen that this arrangement, with a relatively loose loop, permits a certain amount of play between the meter cover and its base, and thus provides only a loose fit and also places metal parts in proximity to the live terminals of the meter, resulting in increased hazard should such seal become broken and the metal parts come in contact with the live terminals.

Now referring to Figure 2, there is shown the sealing arrangements covered by the subject invention, the base of the meter being partially shown at 7 and the cover partially indicated at 8. Surrounding the bottom of the cover is a metal flange 9 which completely surrounds and overlies the peripheral portion of the base member. Suitable means (not shown in the drawing) can be provided to permit the cover to be tightly secured to the base, such as a conventional combined push fit and partial thread arrangement.

Once the cover is properly affixed in place on the base, an aperture 11, provided in the flange portion of the cover, is opposite a slot 12 extending outwardly in the base from a ridge 13, which has next to it a cavity 14, there being a suitable passage 15 extending through the ridge 13 and communicating with the slot 12 and the cavity 14.

Normally the base member 7 is a molded plastic member and the slot 12, the ridge 13, and the cavity 14, the passage 15, and all other parts of the base can be formed during the molding thereof.

Cooperating with the aforesaid parts is the elongated metal tab 16 having the enlarged outer head 17 and the angularly bent and cut-away section 18 providing a hook-like portion or barb at its inner extremity. The hook-like portion 18 is connected to the body of the tab 16 by a relatively thin metallic section 19 for a purpose to be described hereinafter, and next to the thin section 19 is the aperture 21.

Aperture 11 is just wide enough and high enough to permit the tab to be inserted therethrough, the down-turned portion 18 being forced upwardly when passing through the aperture and springing back in place once having cleared therethrough. The tap passes through the slot 12 and through the passage 15 until its outer head 17 rests against the flange portion of the cover. In this position, the inner end of the tab will lie wholly within the cavity 14 and the portion within the cavity will normally include the hook-like inner end 18 and the aperture 21. Passage 15 has its width and height properly dimensioned to permit easy insertion of the tab.

Once the tab is in place, a plug of solidified plastic material may be formed on the inner end of the tab by pouring or pressing a softened mass of the material into the cavity 14 and allowing sufficient time for such material to harden and form a solid body. In the embodiment shown, it has been found that polyethylene is excellent for the plastic plug and can be formed by heating until molten, after which it is poured into cavity 14 until it completely fills up the cavity. When the cavity 14 is substantially full, the inner end of tab 16 will be embedded within the polyethylene material. As the polyethylene hardens, the inner end of the tab will be bonded thereto, and the hook-like portion 18 will complement this bond such that the tab and the plastic plug will be joined strongly together. The plug will thus form an enlarged inner head on the tab.

When the seal has been completed, its parts are as shown in Figure 3, and just prior to solidification of the plug 22, suitable identifying indicia 23 can be molded therein by any suitable method, such as a metal stamp or the like. The meter housing is thus sealed. Any attempt to remove the seal by softening the solidified material will destroy the indicia 23 and thus permit detection of the destruction by mere inspection thereof.

If any attempt is made to separate the tab from its polyethylene plug, the tab will break off at the thin section 19, permitting the plug to drop out and destroy the seal. With the seal thus destroyed, the attempt to tamper with the meter will be readily detected.

Should it be desirable to break the seal for field maintenance or service of the meter, a quick utility seal can be made with the use of the tab member, without the polyethylene plug. Such a seal is shown in Figure 4, wherein the plastic plug 2 and its associated hook-like portion 18 have been removed and replaced by a wire loop 24 and a conventional lead plug 25. It is to be noted that in making the utility seal the tab 16 is inserted as before through the aperture 11, the slot 12, and the passage 15 such that its inner end carrying aperture 21 lies within cavity 14. In this position of the parts, the wire 24 can be effectively drawn through the aperture 21 and its ends drawn together and embedded within a suitable lead plug 25.

From the above it is to be noted that assembly and disassembly of the sealing arrangement is simple and effective, both from a utilitarian and economical standpoint. A tight fit can be maintained between the cover and its associated base member instead of the lose fit inherent in the old type seal illustrated in Figure 1. Additionally, breakage of the seal is highly unlikely, and should this occur, it is well nigh impossible for any part of the metal tab to come in contact with the live parts of the meter or its associated socket. Obviously, with the elimination of the looped wire and lead plug arrangement, corrosion can be substantially reduced in that the tab can be of some suitable corrosion-resistant material, such as stainless steel or the like.

Of added significance is the fact that the new sealing arrangement provides a substantially integral construction, fitting much better into the housing assembly and producing a neater appearance in addition to its more effective sealing. Finally, separation of the seal is simple in the event such separation is desirable for maintenance or service of the meter, and the design is such that a utility seal is quickly and easily installed in the field, using the metal tab as an important component thereof and thus retaining most of the advantages of the factory seal.

Although in accordance with the provision of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is,

1. In a meter housing, the combination of: a base member, a cover removably affixed to said base member, said cover having a flanged portion overlying the peripheral portion of said base member, a cavity in said base member, a ridge next to said cavity, a slot extending from said ridge to the periphery of said base member, a passage in said ridge communicating with said cavity and said slot, an aperture in said flanged portion normally registering with said slot when said cover is affixed in place on said base member, and a metal tab passing through said aperture, said slot, said passage, and extending within said cavity, said tab serving to lock said cover and said base member together, said tab having enlarged outer and inner heads to retain it in place, said inner head comprising a solidified plastic body embedding the inner end of said tab, said body being contained within said cavity.

2. In a meter housing the combination of: a base member, a cover removably affixed to said base member, said cover having a flanged portion overlying the peripheral portion of said base member, a cavity in said base member, a ridge next to said cavity, a slot extending from said ridge to the periphery of said base member, a passage in said ridge communicating with said slot and said cavity, an aperture in said flanged portion normally opposite said slot when said cover is affixed in place on said base member, a metal tab passing through said aperture, said slot, said passage, and extending into said cavity, said tab having an enlarged outer head and having a portion of its inner end bent at an angle to form a hook-like portion, said hook-like portion being joined to said tab by a connecting section of reduced width, and a solidified plastic body within said cavity and embedding said hook-like portion of said tab to form an inner head therefor whereby said tab serves to lock said cover in place on said base member.

References Cited in the file of this patent

UNITED STATES PATENTS

| | | |
|---|---|---|
| Re. 20,647 | Shera | Feb. 1, 1938 |
| 79,801 | Adams | July 14, 1868 |
| 524,876 | Wellhoener | Aug. 21, 1894 |
| 655,393 | Coleman | Aug. 7, 1900 |
| 816,007 | Freschl | Mar. 27, 1906 |
| 952,271 | Edgar | Apr. 5, 1910 |
| 1,919,213 | Emens | July 25, 1933 |
| 2,113,744 | Pixley et al. | Apr. 12, 1938 |